United States Patent Office 3,443,973
Patented May 13, 1969

3,443,973
COMPOSITE VITREOUS ENAMELS AND THEIR PREPARATION
John Bugosh and Lewis C. Hoffman, Wilmington, Del., assignors to E. I. du Pont de Nemours and Company, Wilmington, Del., a corporation of Delaware
No Drawing. Filed Nov. 24, 1964, Ser. No. 413,627
Int. Cl. C03c 5/00; C09c 1/36, 1/10
U.S. Cl. 106—49                             13 Claims

ABSTRACT OF THE DISCLOSURE

A method of preparing composite pigment-vitreous enamel powders, useful in electrostatic aplications, which method involves the steps of:
(a) preparing an aqueous slurry having a pH of at least 8 of a lead borosilicate frit powder;
(b) preparing an aqueous slurry having a pH not higher than 5 of a refractory inorganic pigment more finely divided than the frit powder of step (a), which pigment it titanium oxide, a spinel type pigment, cadmium sulfide or a cadmium sulfoselenide type pigment;
(c) mixing the two slurries whereby agglomeration of the frit and pigment particles results;
(d) separating the agglomerated particles from the aqueous phase of the mixture;
(e) heating the agglomerated particles at 460–650° C. for a time sufficient to develop a firm bond between the frit and pigment particles and to form a loosely bonded cake of the agglomerated particles, the temperature and time of heating being insufficiently high or long to sinter the agglomerated particles; then
(f) breaking up the cake to separate it into individual composite frit-pigment particles.

This invention relates to vitreous enamels and particularly to composite vitreous enamels especially suited for use in decorating glass by electrostatic methods, and to their production.

The terms "vitreous enamel" and "enamel" are used herein to mean an enamel in particulate form consisting essentially of a glass frit and an inorganic heat resistant or refractory pigment. When such an enamel is applied to glass, e.g., in the form of a design, and caused to be fused thereon, a permanent decoration on the glass results.

In electrostatic enamel decorating methods, an electrostatic field established between two oppositely charged electrically conductive surfaces or electrodes is used to effect or assist transfer of dry enamel powder from one electrically conductive surface to another. The electrode to which the particles are delivered may be the glass object to be decorated (e.g., a hot bottle from a bottle molding operation) or an offset plate. If an offset plate is employed, the enamel particles are passed through a stencil screen having therein a desired design so as to form on the plate a powder enamel design which is the mirror image of the design desired on the glass to be decorated, and the enamel design is then transferred electrostatically from the plate to the glass. If no offset plate is to be used, the powder enamel is passed through a stencil screen having therein the desired design and transferred electrostatically directly to the glass to be decorated, e.g., a hot bottle.

In such electrostatic methods, it is highly important if not essential that the powder material applied through the stencil have a fairly definite particle size distribution pattern between the limits of about 1 and 45, preferably about 3 to 30 microns in diameter. Thus, in electrostatic methods employing an offset plate in which a temporary powder image is formed by forcing the powder by means of a stiff brush through a stencil screen against the bottom of which the plate is tightly pressed, or the temporary image may be formed electrostatically as described above, the presence in the powder of a substantial amount of frit or pigment particles finer than 5 micron size results in the blinding of the screen even though the screen openings are much larger than such particles. Also, excessively fine particles adhere too strongly to the offset plate and, therefore, are more difficult to transfer electrostatically from the offset plate to the glass object to be decorated. On the other hand, unduly coarse particles may be too large to pass through the screen openings, and even if passed through, they tend to fall off the offset plate because of their poor adhesion and to create problems in their electrostatic transfer from the offset plate to the glass object.

The pigment components of vitreous enamels must be of very small particle size in order to obtain efficient and effective pigmentation of the decoration. The commonly used $TiO_2$ white pigment will generally be of a particle size averaging about 0.2 micron in diameter and the spinels used to make blues, blacks, browns and greens are not much larger in average particle size. Even the cadmium sulfide-cadmium selenide pigments used for reds, yellows and oranges are generally below 5 microns in average particle size. As a rule the average particle size of the commercial pigments will be around 1 micron or less and they will be substantially free of material approaching a particle size of 5 microns. In contrast, the glass frit components of such enamels are employed in substantially coarser form. Thus, they are generally milled in a ball, pebble or similar mill to an average particle size of from 5 to 10 microns, but the milling generally produces a substantial proportion of material much finer than the average and also leaves a substantial fraction of material coarser than the average.

By compositing the desired relatively finely divided pigment particles with the desired coarser frit particles, composite enamel powder free of undesirable excessively fine or excessively coarse particles can be obtained which can be readily and successfully used in electrostatic decorating methods. One way of preparing such composite enamels involves heating a suitably proportioned mixture of glass frit powder and pigment particles of the desired fine particle size to a temperature at which the frit becomes molten or softened and the pigment particles become dispersed throughout or embedded in the frit. The mixture is then quenched in water and the resulting cake is crushed, ball-milled and classified to give a product of the desired particle size characteristics and composed of particles having a glass frit matrix in which is dispersed the pigment particles. Such composite enamel powders and their preparation are described in pending Mackey and Morgan application, Ser. No. 363,021, filed April 27, 1964.

The present invention relates to composite enamel powders of a different kind, and to their production.

It is an object of the invention to provide improved vitreous enamel powders the particles of which are composites of glass frit particles and pigment particles. A further object is the provision of such enamel powders whose particles are composites of relatively coarse frit particles and relatively fine pigment powders, which composite powders are especially suitable for use in electrostatic glass decorating methods. Another object is the provision of a method for producing such composite enamel powders. Still further objects will be apparent from the following description.

The enamel powders of the invention consist essentially of particles which are composites of relatively coarse glass frit particles having chemically bonded to the surfaces thereof relatively fine pigment particles. The bonding force between the components of the composite is that resulting from a condensation reaction between hydroxylated surfaces of the frit particles and protonated surfaces of the pigment particles. The frit particles of the composite enamel generally will be of particle sizes ranging from about 1 to 45 microns, preferably 3 to 30 mircons in diameter, while the pigment particles which are bonded to the surfaces of the frit particles will be of a relatively finer particle size, generally of the order of 1 micron or less in diameter.

It has been found that when a glass frit powder is slurried in water, the frit particles become negatively charged at their surfaces due to the adsorption of hydroxyl groups to satisfy the unsaturated chemical binding forces emanating from the surfaces of the powder. This negative charge or potential keeps the powder in suspension by repulsion of like charges. The potential can be neutralized by the addition of acid in which case excess protons from acid neutralize the hydroxyl groups on the particle surfaces and lower their charge or potential. When the potential drops below a threshold value, the particles no longer repel one another, the slurry flocculates and the large aggregates formed settle out quickly. The charge on the particles can be augmented by the addition of hydroxyl groups (alkali) to the frit slurry.

It has also been found that in pigment slurries in water the pigment particles are normally positively charged and that their positive charge can be augmented by the addition of protons (acid) to the suspension of the pigment. $TiO_2$ slurries are positive in water and $Al_2O_3$-coated $TiO_2$ slurries are even more positive. Most commercial white titanium oxide ($TiO_2$) pigments are treated in their manufacture so as to effect an absorption of $Al_2O_3$ on their surfaces. It is also common practice to coat $TiO_2$ particles with $SiO_2$, $ZnO$ and combinations of these and other oxides. All such $TiO_2$ pigments which become positively charged in water or which will assume such a charge upon the addition of a water soluble acid can be used in forming the enamel powders of the invention.

Other ceramic pigments can be positively charged by treatment with acid in water. The blue and green pigments based on alumina spinels, such as $CoAl_2O_4$ (Thenard's blue); the black and brown pigments based on iron oxide spinel structures; and the green pigment based on chromina-alumina mixed crystals, are all readily made positive by absorption of protons from acid solution, and, therefore, usable in the practice of the invention. Even the cadmium sulfide-cadmium selenide solid solutions used to make yellow, orange and red pigments, assume positive charges when treated with dilute solutions of acid which are insufficiently strong to decompose the pigment.

It has been discovered that when a positively charged, i.e., protonated, fine particle pigment dispersion is mixed with a negatively charged, i.e., hydroxylated, glass frit dispersion, the unlike charges of the particles of the two dispersions attract each other and the finer pigment particles coat the coarser frit particles. The resulting agglomerated dispersed frit-pigment particles settle out very quickly and may be readily separated from the water by filtration or equivalent methods. After drying, the agglomerated frit-pigment powder behaves very differently from a frit-pigment powder mixture which has been simply suspended in water and does not result in agglomeration of the frit and pigment particles. Thus, the agglomerated powder acts as though no fines were present, it flows readily and shows a low angle of repose and freedom from dust.

Under violent mechanical agitation, however, the frit and pigment components of the agglomerated frit-pigment powders referred to above exhibit a marked tendency to break apart. Thus, the agitation required in the brushing action involved in forcing an enamel powder through a stencil screen onto an offset plate in an electrostatic decorating operation is sufficient to cause separation of the pigment and frit particles from each other. It has been found, however, that the bonds between the pigment and frit particles in the above agglomerated enamel powders can be strengthened sufficiently to avoid such separation by heating the agglomerated frit-pigment powder to effect a condensation reaction between the hydroxylated surfaces of the frit particles and the protonated surfaces of the pigment particles. Temperatures of from about 400 to 650° C. are generally effective for this purpose. Heating times of from 5 minutes to many hours are suitable, depending upon the temperature, the higher the temperature the shorter the time required. The time and temperature should be such that the condensation reaction between the hydroxylated frit surfaces and the protonated pigment surfaces will proceed to provide a sufficiently strong chemical bond between the frit and pigment particles to prevent their separation from each other when the composite particles are forced through a stencil screen. On the other hand, the temperature should not be so high or the time so long as to result in sintering of the aggregates. Heating at temperatures of from 500 to 550° C. for a minimum of about 2 hours at 500° C. to a maximum of about 2 hours at 550° C. is generally preferred.

Heating of the agglomerated frit-pigment powder as indicated above results in a loosely bonded cake which can be readily broken up into the individual frit-pigment composite particles by means of an impact device such as a micro-pulverizer or by simply forcing the material through a sieve. The forces holding the heated mass (cake) together are distinctly weaker than the chemical forces bonding the pigment particles to the frit particles so that the frit-pigment composites remain intact during the micro-pulverizing.

It will be seen from the foregoing that the method for producing the composite enamels involves the following steps:

(1) Preparing an aqueous slurry of the frit powder having a pH of at least 8, preferably the pH of the slurry is adjusted to at least 10 by the addition thereto of a water-soluble alkaline agent such as an alkali metal hydroxide or ammonium hydroxide;

(2) Preparing an aqueous slurry of the relatively finely divided pigment powder and adjusting its pH downward to a pH not higher than about 5 by the addition thereto of a water-soluble acidic agent;

(3) Mixing together the two slurries resulting from steps (1) and (2) in proportions to provide from 3 to 20 parts of the pigment per 100 parts of the frit, on a dry weight basis, in the resulting mixture, whereby agglomeration of the frit and pigment particles results;

(4) Separating the agglomerated particles from the aqueous phase, e.g., by filtering and drying or by spray drying;

(5) Heating the separated agglomerates, for example, at 550° C. for 1 hour, to form a loosely bonded cake of the agglomerates; and then, (6) Breaking up the cake to separate it into its individual frit-pigment composite particles, e.g., by forcing the cake through a screen or by micro-pulverizing.

Any of the commonly used refractory or heat resistant pigments such as those mentioned previously may be employed in preparing the composite powder enamel products. Similarly, any of the glass frits commonly used in formulating enamels for glass decorating purposes can also be employed. Most generally, the frit will be a lead borosilicate frit of the following composition:

| | Weight percent |
|---|---|
| PbO | 50–80 |
| $SiO_2$ | 10–30 |
| $B_2O_3$ | 5–15 |
| $TiO_2$ | 0–5 |
| $ZrO_2$ | 0–5 |
| $Na_2O$ | 0–5 |
| NaF | 0–5 |
| $PbF_2$ | 0–10 |
| CdO | 0–5 |
| ZnO | 0–20 | with the above oxides constituting at least 90% of the weight of the frit.

The frit used in the examples reported below had the following composition: PbO, 56.8%; $B_2O_3$, 5.5%; $SiO_2$, 27.2%; ZnO, 1.7%; $TiO_2$, 0.8%; $ZrO_2$, 4.1% and $Na_2O$, 3.9%. The frit employed had been ball-milled to give a frit powder of particle size of from 0.5 to 45 microns.

The general procedure followed in the examples involved slurrying the frit powder in water to provide a slurry containing 40% frit by weight. A second slurry of the finely divided pigment (a commercial alumina-coated $TiO_2$ pigment having a particle size of about 0.2 micron) in water containing about 4% pigment by weight was also prepared. The frit slurry was stirred for about 5 minutes while the pigment slurry was slowly poured in, the slurries being employed in proportions to provide in the mixture 5 parts of the pigment per 100 parts by weight of the frit. The slurry mixture was allowed to settle and the frit-pigment agglomerates were filtered out, and heated for 30 minutes at 550° C. to develop chemical bonding between the frit and pigment components of the agglomerated product. The resulting loosely bonded cake was broken up into its composite frit-pigment particles by a micro-pulverizing treatment and then tested by brushing through a screen stencil onto an aluminum offset plate. A number of powder enamel prints on such an offset plate were prepared in this manner so as to provide a basis for judging the adequacy of the chemical bonding between the frit and pigment components of the composite enamel particles. In preparing the prints, the enamel powder was forced by means of a stiff paint brush through the stencil screen onto the offset plate positioned tightly against the bottom of the screen. If the bonding between the frit and pigment components of the powder particles was inadequate, finely divided pigment particles separated from the frit particles soon blinded or blocked the screen openings and thus rendered the screen useless. On the other hand, with adequate chemical bonding between the pigment and frit particles, the stencil screen could be used repeatedly to form many satisfactory prints on the offset plate. In the tables below, the results are rated as bad (B), good (G) or excellent (E). "Bad" means that no more than 2 prints could be made before blinding of the screen occurred, "good" means that 3–5 prints could be made before blinding occurred, and "excellent" means that at least 6–10 and usually an indefinite number of prints could be made without blinding occurring.

In one set of experiments, the frit and pigment slurries were employed under various pH conditions, the adjustments in pH, when made, being effected by the addition to the slurries of various bases or acids. The slurries were then mixed and the procedure indicated above was followed, including the testing of the final products in preparing prints on the offset plate. The results are shown in Table I wherein the terms "bad," "good" and "excellent" refer to the printability of the final enamel powder product and have the significance indicated above. The table also shows the pH values for the frit and pigment slurries used and the chemicals employed in adjusting the pH to the values shown.

TABLE I.—PRINTABILITY OF COMPOSITE ENAMEL POWDER

| | pH of pigment slurry | | | |
|---|---|---|---|---|
| pH of frit slurry | As is, 5.8 | 5 ($HNO_3$) | 3 ($HNO_3$) | 1 ($HNO_3$) |
| Example 1: | | | | |
| As is, 7.1 | B | G | G | G |
| 8.0 with $NH_4OH$ | B | G | E | E |
| 10.0 with $NH_4OH$ | B | G | E | E |
| 12.0 with $NH_4OH$ | B | E | E | E |
| | As is, 5.8 | 5 (HF) | 3 (HF) | 1 (HF) |
| Example 2: | | | | |
| As is, 7.1 | B | G | G | E |
| 8.0 with $NH_4OH$ | B | G | G | E |
| 10.0 with $NH_4OH$ | B | G | E | E |
| 12.0 with $NH_4OH$ | B | E | E | E |
| | As is, 5.8 | 5 (HCl) | 3 (HCl) | 1 (HCl) |
| Example 3: | | | | |
| As is, 7.1 | B | B | G | G |
| 8.0 with NaOH | B | B | E | G |
| 10.0 with NaOH | B | G | G | E |
| 12.0 with NaOH | B | G | E | E |

In the above table, B represents "bad," G represents "good" and E represents "excellent."

Results generally similar to those above were obtained when lithium hydroxide, potassium carbonate, barium carbonate or calcium carbonate was used to adjust the pH of the frit slurry and when sulfuric acid was used to adjust the pH of the pigment slurry. The use of volatile agents such as $NH_4OH$, HF, $HNO_3$ or HCl for adjusting pH is preferred. If nonvolatile agents, e.g., NaOH, which would leave a residue when the final enamel product is fired on the glassware, are used, it is generally preferred that the slurry of the agglomerated frit-pigment particles (resulting from the mixing of the frit and pigment slurries) be thoroughly washed before the agglomerated particles are subjected to the heating treatment.

In order to obtain final composite enamels which can be employed to produce a worthwhile number of prints on an offset plate before blinding of the stencil screen results, it has been found that the pH of the frit slurry should be at least 8 and the pH of the pigment slurry should be not higher than about 5. Preferably, the spread between the pH values of the two slurries will be at least 4. Most preferably, the pH of the frit slurry will be at least 10, the pH of the pigment slurry will be not higher than 3 and the pH spread will be from 7 to 11 pH units. The pH of the frit slurry can be much higher than the maximum value of 12 shown in Table I and the pH of the pigment slurry can be much lower than pH 1. However, alkalinites greater than pH 12 and acidities greater than pH 1 result in no significant added advantages and generally will not be used for economic reasons.

A second series of experiments was carried out as described above. In this series, however, all the frit slurries were adjusted to pH 12 with $NH_4OH$, all the pigment slurries were adjusted to pH 1 with $HNO_3$, and the heat treatments to develop chemical bonding between frit and pigment particles were carried out at various temperatures and for various times. The temperatures and times of heating are shown in Table II along with bad (B), good (G) and excellent (E) ratings for the products. The designation "S" means that the agglomerate powder sintered under the heating conditions used to give a sinter cake which could not be reduced by micro-pulverizing to a composite frit-pigment powder free of objectionable excessively finely divided material.

TABLE II.—EFFECT OF HEATING TIME AND TEMPERATURE

| Example | Temp., °C. | Time, minutes | | | | |
|---|---|---|---|---|---|---|
| | | 30 | 60 | 90 | 120 | 240 |
| 4 | 400 | B | B | B | B | B |
| 5 | 450 | B | B | B | B | G |
| 6 | 500 | B | G | G | E | E |
| 7 | 550 | E | E | E | E | S |
| 8 | 600 | G | S | S | S | S |
| 9 | 650 | S | S | S | S | S |

Although the results for Examples 4 and 5 indicate that adequate chemical bonding did not develop in 240 minutes at 400 to 450° C., longer heating at those temperatures can be used to achieve adequate bonding. The higher the temperature the shorter the time required to achieve such bonding. However, temperatures and times high enough and long enough to effect sintering are undesirable and should be avoided. Thus, at 550° C., satisfactory bonding was achieved in times of 30 to 120 minutes, but when the heating was extended to 240 minutes sintering resulted. At 600° C., a time of 30 minutes was usable but 60 minutes resulted in sintering. While sintering resulted in 30 minutes at 650° C., shorter times insufficient to result in sintering are usable.

The effective times and temperature for heating will vary somewhat depending upon the specific frit employed since its composition will largely govern the severity of conditions which can be used while avoiding sintering. However, in general adequate chemical bonding can be developed at temperatures of 400 to 650° C., in times of 5 minutes to many hours, depending on the temperature. Temperatures of 500 to 575° C., and heating times of 30 to 240 minutes are generally quite practical and are preferred.

Example 10

The general procedure of Examples 1 to 3 was followed except that the milled frit was classified and the cut consisting essentially of particles ranging in size of from 3 to 30 microns was used. The frit slurry was adjusted to pH 12 with ammonium hydroxide and the titanium oxide pigment slurry was adjusted to pH 1 with nitric acid. Following mixing of the two slurries and separation of the frit-pigment agglomerate, the latter was heated at 500° C. for 2 hours and the resulting loosely bonded cake was micro-pulverized. The composite enamel powder obtained gave excellent (E rating) prints on the offset plate in the test described above.

Example 11

The general procedure of Examples 1 to 3 was followed employing various pigments (in place of titanium oxide) in the proportions of 4 parts of pigment per 100 parts of frit. The pigments used were: a cobalt-chrome violet, a cobalt aluminate blue, a chrome green, an iron chromate brown, an iron cobalt chromate black, cadmium sulfide yellow, a cadmium sulfoselenide orange and a cadmium sulfoselenide red. In these experiments, the frit slurry was adjusted to pH 12 with ammonium hydroxide and the pigment slurries were adjust to pH 1 with nitric acid, and the heating to strengthen the chemical bond between the agglomerated particles was carried out at 500° C. for 1 hour. The final composite enamel powders gave excellent (E ratings) prints on the offset plate in the test described above.

The embodiments of the invention in which an exclusive property or privilege is claimed are as follows:

1. A composite vitreous enamel powder consisting essentially of lead borosilicate frit particles having bonded to their surfaces relatively finely divided inorganic refractory pigment particles, said enamel powder having been prepared by the method of claim 8.

2. A powder according to claim 1 wherein the weight ratio of pigment particles to frit particles is from 3 to 20:100.

3. A powder according to claim 1 wherein the pigment particles are a titanium oxide pigment and the weight ratio of pigment particles to frit particles is 3 to 20:100.

4. A composite vitreous enamel powder consisting essentially of lead borosilicate frit particles of a particle size of from about 1 to 45 microns having bonded to their surfaces particles of a refractory pigment of substantially smaller particle size, said enamel powder having been prepared by the method of claim 8.

5. A composite enamel powder consisting essentially of lead borosilicate frit particles of a particle size of from 3 to 30 microns having bonded to their surfaces particles of a refractory pigment of substantially smaller particle size, said enamel powder having been prepared by the method of claim 8.

6. A composite vitreous enamel powder consisting essentially of lead borosilicate frit particles of a particle size from about 3 to 30 microns having bonded to their surfaces a titanium oxide pigment of a particle size not exceeding 1 micron, said enamel powder having been prepared by the method of claim 8.

7. A powder according to claim 6 wherein the weight ratio of pigment particles to frit particles is from 3 to 20:100.

8. A method of preparing a composite enamel powder consisting essentially of the steps of:
   (a) preparing an aqueous slurry of a lead borosilicate frit powder, said slurry having a pH of at least 8, said frit consisting essentially of the following oxides on a weight basis: 50 to 80% PbO, 10 to 30% $SiO_2$, 5 to 15% $B_2O_3$, 0 to 5% $TiO_2$, 0 to 5% $ZrO_2$, 0 to 5% $Na_2O$, 0 to 5% NaF, 0 to 10% $PbF_2$, 0 to 5% CdO and 0 to 20% ZnO, which oxides constituted at least 90% of the weight of the frit;
   (b) preparing an aqueous slurry of a refractory inorganic pigment powder which is more finely divided than said frit powder and adjusting the pH of the pigment slurry to a pH not higher than 5, said pigment being from the group consisting of titanium oxide, spinel type pigments, and cadmium sulfide and cadmium sulfoselenide type pigments;
   (c) mixing said slurries in such proporions as to provide in the resulting mixture from 3 to 20 parts of said pigment per 100 parts of said frit, on a dry weight basis, whereby agglomeration of the frit and pigment particles results;
   (d) separating the agglomerated particles from the aqueous phase of said mixture;
   (e) heating the agglomerated particles to a temperature of from 400 to 650° C. for a time sufficient to develop a firm bond between the frit and pigment particles and to form a loosely bonded cake of the agglomerated particles, said temperature and said time being insufficiently high or long, respectively, to sinter said agglomerated particles; then
   (f) breaking up said cake to separate it into indiivdual composite frit-pigment particles.

9. The method of claim 8 wherein the slurry in step (a) is adjusted to a pH of at least 10 by the addition thereto of a water-soluble alkaline agent.

10. The method of claim 8 wherein the slurry in step (a) is adjusted to a pH of 8 to 12 by the addition thereto of ammonium hydroxide, and the slurry in step (b) is adjusted to a pH of not higher than 5 by the addition thereto of an acid from the group consisting of nitric, hydrofluoric and hydrochloric acids.

11. The method of claim 8 wherein the slurry in step (a) is adjusted to a pH of 10 to 12 by the addition thereto of ammonium hydroxide, the pigment is a titanium oxide pigment the slurry of which is adjusted in step (b) to a pH of 1 to 3 by the addition thereto of an acid from the group consisting of nitric, hydrofluoric and hydrochloric acids, and wherein the heating in step (e) is effected at a temperature of 500 to 550° C.

12. The method of claim 8 employing in step (a) a frit powder of a particle size of from about 1 to 45 microns.

13. The method of claim 8 employing in step (a) a frit powder of a particle size of from about 3 to 30 microns, and employing in step (b) a pigment powder of particle size not exceeding about 1 micron.

References Cited

UNITED STATES PATENTS

| 2,556,896 | 6/1951 | Beatty et al. | 106—49 |
| 2,795,506 | 6/1957 | Sweo et al. | 106—48 |
| 3,055,762 | 9/1962 | Hoffman | 106—49 |
| 3,115,415 | 12/1963 | Hoffman | 106—49 |
| 3,290,163 | 12/1966 | Elbreder | 106—308 X |

HELEN M. McCARTHY, *Primary Examiner.*

W. R. SATTERFIELD, *Assistant Examiner.*

U.S. Cl. X.R.

106—48, 300, 301, 302, 304, 308; 117—93.4, 100